United States Patent
Hashimoto et al.

(10) Patent No.: US 7,810,935 B2
(45) Date of Patent: Oct. 12, 2010

(54) DISPLAY UNIT AND LIGHT-EMITTING UNIT

(75) Inventors: Akira Hashimoto, Shiojiri (JP); Taisuke Uehara, Chino (JP)

(73) Assignee: Seiko Epson Corporation, Tokyo (JP)

( * ) Notice: Subject to any disclaimer, the term of this patent is extended or adjusted under 35 U.S.C. 154(b) by 701 days.

(21) Appl. No.: 11/425,302

(22) Filed: Jun. 20, 2006

(65) Prior Publication Data
US 2006/0285086 A1 Dec. 21, 2006

(30) Foreign Application Priority Data
Jun. 20, 2005 (JP) ............................ 2005-178963

(51) Int. Cl.
G03B 21/00 (2006.01)
H04N 5/74 (2006.01)
(52) U.S. Cl. ..................... 353/122; 349/61; 348/766
(58) Field of Classification Search ............... 349/5, 349/7, 9, 61–65, 69–71; 348/744, 759, 766; 362/277, 29, 225, 255, 286, 615; 257/88; 353/122
See application file for complete search history.

(56) References Cited

U.S. PATENT DOCUMENTS

| | | | |
|---|---|---|---|
| 4,278,765 A | 7/1981 | Debabov et al. | |
| 5,703,663 A * | 12/1997 | Fujioka et al. | 349/5 |
| 6,195,136 B1 * | 2/2001 | Handschy et al. | 349/5 |
| 6,246,450 B1 * | 6/2001 | Inbar | 349/5 |
| 6,273,571 B1 * | 8/2001 | Sharp et al. | 353/122 |
| 6,330,039 B2 * | 12/2001 | Matsui et al. | 348/742 |
| 6,607,276 B1 * | 8/2003 | Akiyama | 353/38 |
| 6,707,516 B1 * | 3/2004 | Johnson et al. | 349/78 |
| 6,717,355 B2 * | 4/2004 | Takahashi et al. | 313/503 |
| 6,827,450 B1 * | 12/2004 | McGettigan et al. | 353/31 |
| 7,396,130 B2 * | 7/2008 | Chen et al. | 353/31 |
| 2001/0022613 A1 | 9/2001 | Matsui et al. | |
| 2005/0270281 A1 * | 12/2005 | Moon et al. | 345/204 |

(Continued)

FOREIGN PATENT DOCUMENTS

EP 1 347 653 A2 9/2003

(Continued)

OTHER PUBLICATIONS

Wick, et al., "Short- and long-term changes in proteome composition and kinetic properties in a culture of *Escherichia coli* during transition from glucose-excess to glucose-limited growth conditions in continuous culture and vice versa" *Environ. Microbiol.* 3(9):588-599 (Sep. 2001).

(Continued)

*Primary Examiner*—Georgia Y Epps
*Assistant Examiner*—Danell L Owens
(74) *Attorney, Agent, or Firm*—Oliff & Berridge, PLC

(57) ABSTRACT

A display unit includes: a light modulation unit that includes an effective area, and modulates an illumination light entering to the effective area; a light-emitting unit that includes a plurality of light-emitting areas that can be made to emit a light or stop emitting a light, and are substantially similar in outline shape to a plurality of effective image modulation areas set in the effective area; and a critical illumination system that guides, as the illumination light, a luminous flux as a result of light emission of the light-emitting unit onto the effective image modulation areas in the effective area of the light modulation unit.

10 Claims, 5 Drawing Sheets

U.S. PATENT DOCUMENTS

2008/0192141 A1* 8/2008 Aoki .......................... 348/445

FOREIGN PATENT DOCUMENTS

| EP | 1 363 460 A2 | 11/2003 |
| EP | 1 463 337 A2 | 9/2004 |
| JP | A 11-64977 | 3/1999 |
| WO | WO 03/008605 A2 | 1/2003 |
| WO | WO 03/008606 A2 | 1/2003 |
| WO | WO 03/077013 A2 | 9/2003 |

OTHER PUBLICATIONS

Raman, et al., "Proteome Analysis to Assess Physiological Changes in *Escherichia coli* Grown Under Glucose-Limited Fed-Batch Conditions," *Biotech. Bioeng.* 92(3):384-392 (Nov. 2005).

* cited by examiner

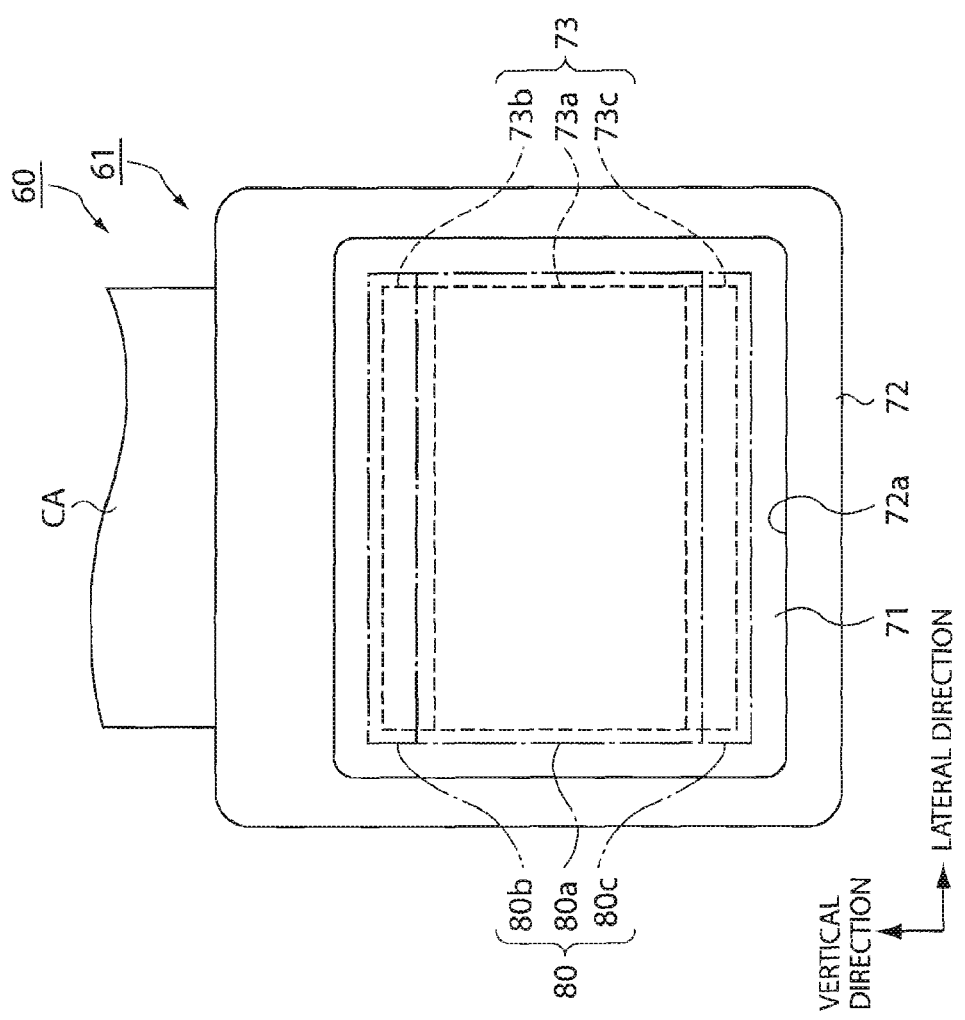
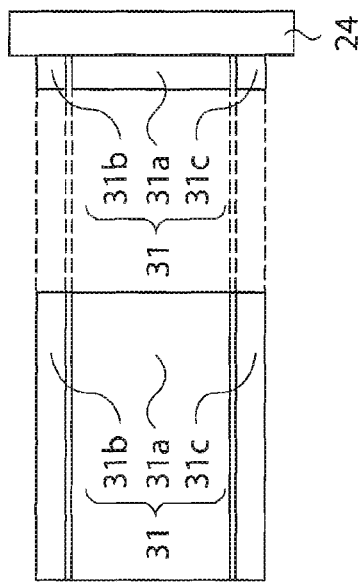
FIG. 2A
FIG. 2B  FIG. 2C

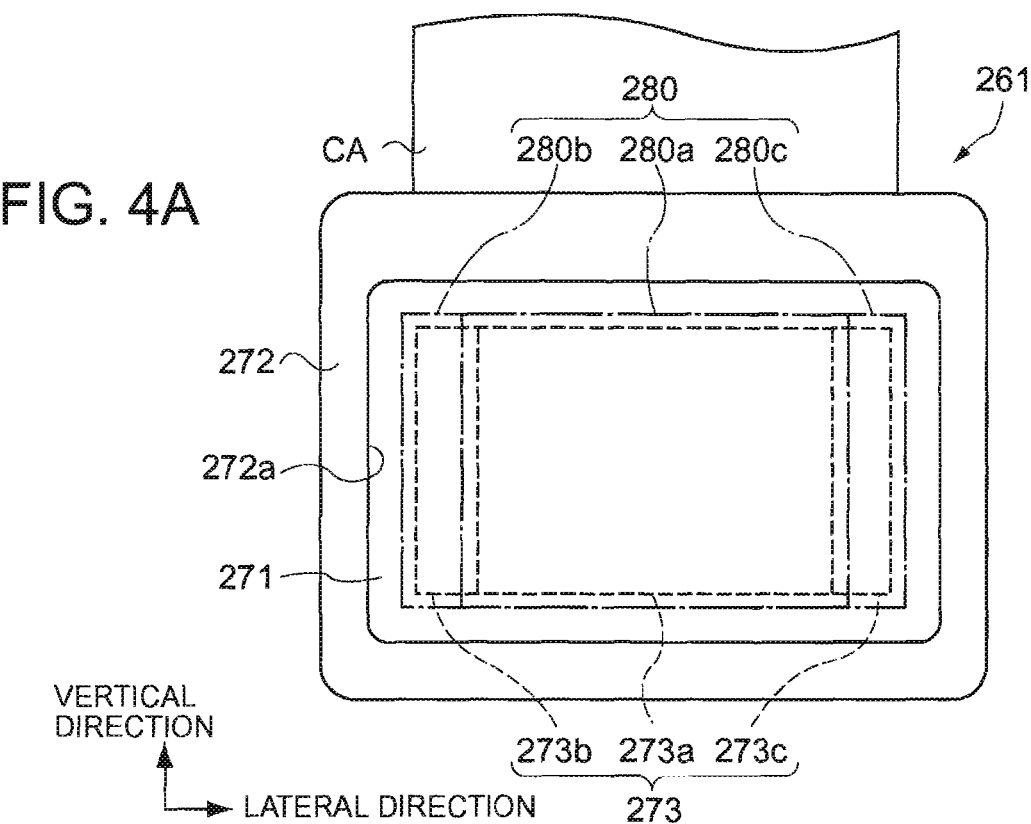
FIG. 4A
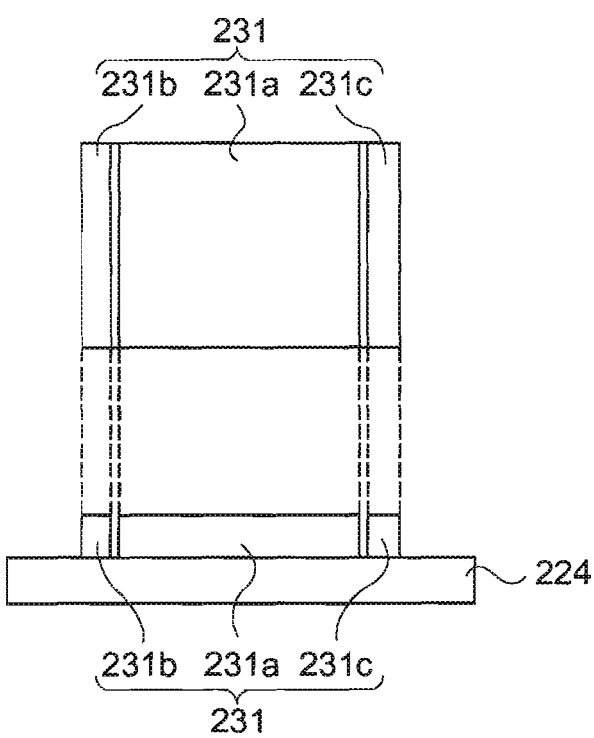
FIG. 4B
FIG. 4C

DISPLAY UNIT AND LIGHT-EMITTING UNIT

This patent application claims priority from Japanese Patent Application No. 2005-178963, filed in the Japanese Patent Office on Jun. 20, 2005, the entire disclosure of which is hereby incorporated by reference.

BACKGROUND

1. Technical Field

The present invention relates to a projector that displays, through projection or others, images formed on a liquid crystal panel, or others, other types of display units, and a light-emitting unit that emits illumination light for projection.

2. Related Art

In the projector of a previous type, light coming from a light source is directed to an optical system configured by a pair of microlens arrays, and then to a color separation system for color separation therein. The resulting color lights are directed to each corresponding optical path, and then to each corresponding liquid crystal panel so that the liquid crystal panels are illuminated. For more details, refer to Patent Document 1 (JP-A-11-64977).

In such a projector, a pixel area (corresponding to an effective area in the invention) formed to a liquid crystal panel is fixed in size (outline shape) depending on the liquid crystal panel in use. For projection of images varying in aspect ratio, the images are displayed within thus fixed outline shape of the pixel area. More in detail, the outside shape of a pixel area, i.e., length-to-width ratio, is generally fixed to be substantially 3:4. For display of any image having a length-to-width ratio of 9:16 within the outline shape of the pixel area, e.g., high-definition image with an aspect ratio of 16:9, the pixel area with a length-to-width ratio of substantially 3:4 (corresponding to an image with an aspect ratio of 4:3) is partially made unavailable in the vertical direction, i.e., no image is projected so that no light is passed therethrough. In this manner, the length-to-width ratio of 9:16, i.e., aspect ratio of 16:9, is implemented.

The problem with Patent Document 1 is that the illumination unit and the projection unit require the microlens array and the color separation system, whereby the illumination system is complicated in configuration.

Another problem comes up when any image of different aspect ratio is to be displayed or the purpose, even if the pixel area is partially modulated in the vertical direction and made unavailable for light transmission thereby, the portion corresponding to the unavailable image area is not turned to black in color after projected on the screen. The black is the color of light not to make the light pass therethrough. This i caused by the fact that the illumination light coming from the light source is directed to the entire pixel area of the liquid crystal panel, and as a result, the projected image is reduced in contrast or others.

SUMMARY

An advantage of some aspects of the invention is to provide a projector that can offer better quality for projection images with light illumination suiting each different illumination area using a simple illumination system, other types of display units, and a light-emitting unit.

An aspect of the invention is directed to a display unit that includes: a light modulation unit that includes an effective area, and modulates illumination light entering to the effective area; a light-emitting unit that includes a plurality of light-emitting areas that can be made to emit light or stop emitting light, and are substantially similar in outline shape to a plurality of effective Image modulation areas set in the effective area; and a critical illumination system that guides, as the illumination light, a luminous flux as a result of light emission of the light-emitting unit onto the effective image modulation areas in the effective area of the light modulation unit.

With such a display unit, a light-emitting unit includes a plurality of light-emitting areas that can be made to emit light or stop emitting light, and are substantially similar in outline shape to a plurality of effective image modulation areas set in the effective area of the light modulation unit. The luminous flux as a result of light emission of the light-emitting unit is directed by a critical illumination system to the effective image modulation areas of the light modulation unit as illumination light. This enables the use of an illumination system of a simple configuration with no pseudo surface-emitting light source. By using also the light-emitting unit having a plurality of light-emitting areas that are substantially similar in outline shape to a plurality of effective image modulation areas of the light modulation unit, achieved is direct and efficient light illumination. As a result, the illumination light directed to the effective image modulation areas is modulated by the light modulation unit so that the resulting exiting light, i.e., the protected image, can be increased in quality, e.g., contrast characteristics.

As such, with a simple lens configuration, any effective image modulation area required to be illuminated is accordingly illuminated by making the corresponding light-emitting area emit light. For any effective image modulation area not required to be illuminated, the corresponding light-emitting area is made to stop emitting light so that the invention can provide a projector that can offer better quality for projection images, other types of display units, and a light-emitting unit.

The display unit of the aspect is preferably provided with a modulation area change section that selects any of the effective image modulation areas for a change, and a light-emitting area change section that selects any of the light-emitting areas for a change. In such a display units when the modulation area change section selects any of the effective image modulation areas for a change, the light-emitting area change section responsively selects any of the light-emitting areas, for a change, corresponding to the changed effective image modulation area to enable light emission or stop light emission with a substantially similar outline shape.

With such a display unit, after the modulation area change section selects any of the effective image modulation areas for a change, the light-emitting area change section responsively selects, for a change, any of the light-emitting areas corresponding to the changed effective image modulation area to enable light emission or stop light emission with a substantially similar outline shape. With such a configuration, after the effective image modulation area is changed to the one having the outline shape corresponding to an image of a different aspect ratio, for example, the light-emitting area is also changed to the one corresponding to he changed effective image modulation area. Though such area changes, for any effective image modulation area not required to be illuminated, the corresponding light-emitting area is made to stop emitting light, and for any effective image modulation area required to be illuminated, the corresponding light-emitting area is made to emit light to direct the illumination light. This accordingly increases the customer convenience of the display unit so that the illumination light can be guided or not guided to the changed effective image modulation area in a direct manner with efficiency.

In the display unit of the aspect, preferably, the light-emitting unit includes a light-emitting layer that emits color light, and a fluorescent layer that emits fluorescent light in response to the light from the light-emitting layer. The light-emitting areas are preferably each corresponding to a light-exiting area of the fluorescent layer. With this being the case, the luminous flux coming from a fluorescent light source can be directed onto the effective areas with efficiency as the illumination light.

In the display unit of the aspect, preferably, the light-emitting unit includes a solid-state light-emitting device, and the light-emitting areas are a surface emitting layer of the solid-state light-emitting device. With this being the case, the light modulation unit can be illuminated utilizing luminous fluxes coming from the surface emitting layer of the solid-state light-emitting device having good efficiency and controllability.

In the display unit of the aspect, preferably, the light-emitting unit includes a solid-state light-emitting device, and the light-emitting areas are a fluorescent layer formed on a surface emitting layer of the solid-state light-emitting device. With this being the case, the light modulation unit can be illuminated utilizing light of desired wavelength characteristics, which is derived by appropriately converting, on the fluorescent layer, luminous fluxes coming from the surface emitting layer of the solid-state light-emitting device having good efficiency and controllability.

In the display unit of the aspect, preferably, the light-emitting areas are each configured flat to be able to emit light or stop emitting light in a pane of various predetermined length-no-width ratios. With this being the case, the effective image modulation areas of the effective area in the light modulation unit are also configured flat with various predetermined length-to-width ratios so that the flat effective image modulation area of a predetermined length-to-width ratio can be made to emit light or stop emitting light in a direct manner with efficiency.

In the display unit of the aspect, preferably, the predetermined length-to-width ratios are of substantially 3:4 and substantially 9:16. If this is the case, the effective image modulation areas can be illuminated or not illuminated directly and efficiently by making the light-emitting areas each corresponding to the effective image modulation areas emit light or stop emitting light in the following cases. That is; in the case of forming an effective image modulation area of substantially 9:16 in an effective area (effective image modulation area) formed fixedly, to be of substantially 3:4, to a liquid crystal panel for use with a light modulation unlit, and in the case of forming an effective image modulation area of substantially 3:4 in an effective area (effective image modulation area) formed fixedly to be of substantially 9:16.

In the display unit of the aspect, preferably, the critical illumination system projects the light as a result of light emission of the light-emitting areas in the light-emitting unit to extend over the effective image modulation areas of the effective area in the light modulation unit while substantially aligning the light with the effective image modulation areas. With this being the case, the luminous fluxes coming from the light-emitting unit can be utilized without waste, and the light reduction can be prevented in the vicinity of the effective Image modulation areas In the display unit, of the aspect, preferably, the critical illumination system magnifies the light as a result of light emission of the light-emitting areas in the light-emitting unit with a predetermined magnification factor, and projects a magnified result onto the effective image modulations areas of the effective area in the light modulation unit. In this case, even if the light-emitting areas are relatively small in size, the relatively large-sized light modulation unit can be illuminated.

In display unit of the aspect is preferably further provided with a projection lens that magnifies the light coming from the light modulation unit for projection. With this being the case, the resulting projector can magnify light having been passed through the light modulation unit or reflected thereby before projecting the light to an externally-disposed screen or others.

The light-emitting unit in the display unit of the aspect preferably includes the above-described light-emitting area. If this is the case, such a light-emitting area is plurally provided for each of a plurality of effective image modulation areas of the light modulation unit so that the resulting light-emitting unit can illuminate or not illuminate the effective image modulation areas in a direct manner with efficiency by making their corresponding light-emitting areas emit light or stop emitting light.

BRIEF DESCRIPTION OF THE DRAWINGS

The invention will be described with reference to the accompanying drawings, wherein like numbers reference like elements.

FIGS. 2A to 2C are all a diagram for illustrating the relationship In terms of shape between a light source unit and a light modulation section of FIG. 1, specifically, FIG. 2A shows the front configuration of a liquid crystal panel configuring the light modulation section, FIG. 2B shows the front configuration of a light-emitting section formed to the light source unit, and FIG. 2C shows the side-surface configuration of the light-emitting section of the light source unit.

FIG. 4A to 4C are all a diagram showing a shape-changed liquid crystal panel and light-emitting section In a second embodiment of the invention, specifically FIG. 4A shows the front configuration of a liquid crystal panel configuring a light modulation section, FIG. 4B shows the front configuration of the light-emitting section formed to a light source unit, and FIG. 4C snows the side-surface configuration of the light-emitting section of the light source unit.

DESCRIPTION OF EXEMPLARY EMBODIMENTS

Described below are embodiments of the invention by referring to the accompanying drawings.

First Embodiment

Figure 1:
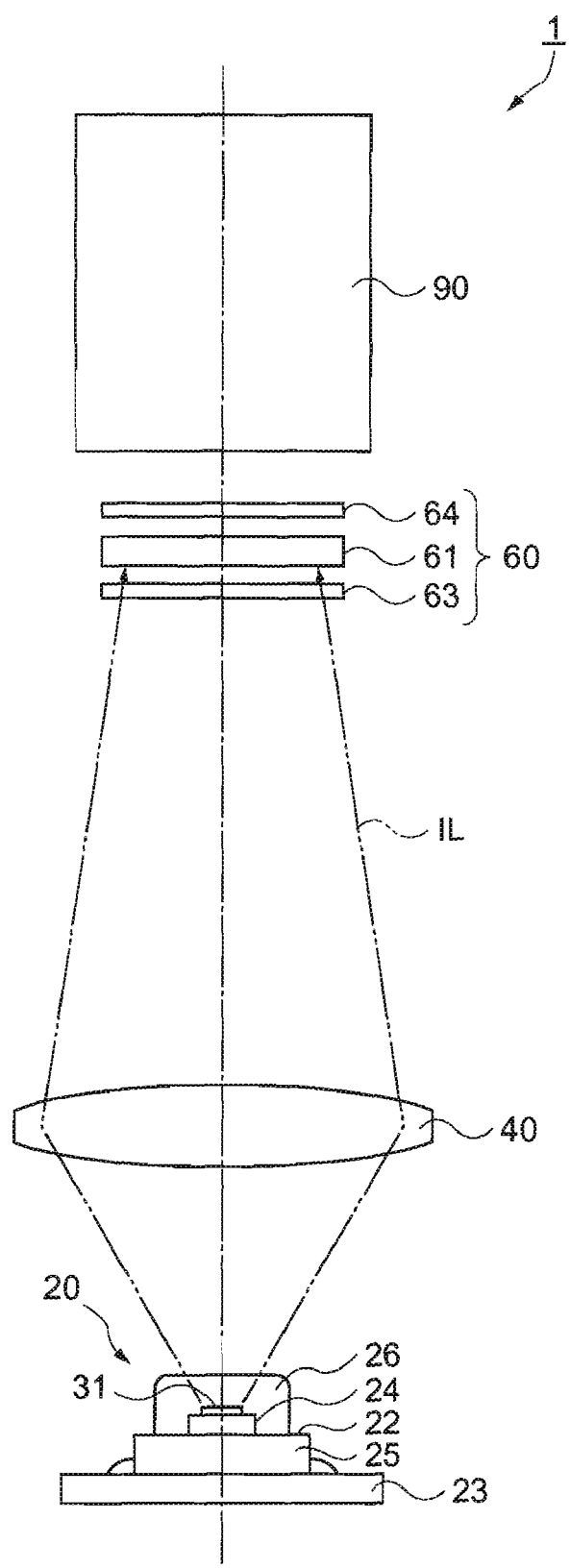
FIG. 1 is a diagram for illustrating a projector serving as a display unit in a first aspect of the invent ion.

FIG. 1 is a diagram for illustrating a projector serving as a display unit in a first aspect of the invention. By referring to FIG. 1, a description will be given about the configuration and operation of a projector As shown in FIG. 1, the projector l is provided with a light source unit 20, an illumination system 40, a light modulation section 60, and a projection lens 90. The light source unit 20 generates source light, and the illumination system 40 gathers the source light coming from the light source unit 20 whenever necessary. The light modulation section 60 is illuminated by the illumination light that is through with the illumination system 40, and the projection lens 90 projects the light from the light modulation section 60 onto a screen, which is not shown.

The light source unit 20 includes a light-emitting unit 22, which is incorporated on a circuit board 23 equipped with a power supply or others. Thee light-emitting unit 22 generates source light of red, green, blue, or substantially white. Here, the color including every color light is white. The source light generated in this embodiment is assumed as being substantially white. The light-emitting unit 22 is equipped therein with an LED (Light Emitting Diode) chip 24 being a solid-state light-emitting device. This LED chip 24 is mounted on a resin- or ceramic-made base 25, and is sealed in a transparent-resin-made package 26 so as to enable the source light to exit from the front. The LED chip 24 is formed thereon with a light-emitting section 31 being a rectangular-shaped surface emitting layer serving as a light-emitting area. From the entire light-emitting section 31, the source light is directed to be substantially uniform. That is, the light-emitting section 31 is a rectangular-shaped surface emitting device. More detailed description will be left for later by referring to FIG. 3. Although not shown, the LED chip 24 is made of a sapphire substrate or others, and the light-emitting section 31 formed on such a substrate has electrode layers with a thin-film active layer therebetween. The active layer takes charge of generating light varying in wavelength through band configuration control, and the upper electrode layer is formed thereon with a transparent electrode layer. These transparent electrode layer and lower electrode layer are each connected with a metal electrodes and a power supply comes from the side of the circuit board 23.

The illumination system 40 is a critical illumination system configured by a sphere lens whose surfaces are both convex. The illumination optical system 40 gathers source light coming from the light-emitting section 31 of the light source unit 20 with a constant divergence angle. Thus gathered light is substantially-uniformly directed to the light modulation section 60. At this time, the illumination optical system 40 forms an image to an effective area (specifically an effective image modulation area, will be described later) in the light modulation section 60. For image formation as such, the light emitted by the light emitting section 31 is magnified by a predetermined magnification factor, e.g., magnification factor of several to tens. That is, the light-emitting section 31 and the effective areas of the light modulation section 60 are all conjugate in terms of position to the illumination system 40.

The light modulation section 60 is provided with a liquid crystal panel 61, and a pair of polarizer filters 63 and 64. The liquid crystal panel 61 receives illumination light IL gathered by a lens of the illumination system 40, and the polarizer filters 63 and 64 are so disposed as to sandwich the liquid crystal panel, 61. The polarizer filters 63 and 64, and the liquid crystal panel 61 therebetween configure a liquid crystal valve, i.e., the light modulation unit, for use for two-dimensionally modulating the brightness of the illumination light. The liquid crystal panel 61 is a light-transmissive light modulation unit for changing the spatial distribution of the illumination light IL in the polarizing direction. The polarizing state of the illumination light IL entered to the liquid crystal panel 61 is adjusted on a pixel basis. Such state adjustment is made based on a drive signal or an image signal that is provided to the liquid crystal panel 61 as an electric signal. At the time of state adjustment as such, the polarizer filters 63 and 64 adjust the polarizing direction of the illumination light entered to the liquid crystal panel 61, and from the light exiting from the liquid crystal panel 61, extract the modulated light in a predetermined polarizing direction.

When the illumination light IL is of red, green, blue, or substantially white, the liquid crystal panel 61 can form light corresponding to an image in which the color light is two-dimensionally modulated. With this embodiment in which the illumination light IL is substantially white, every pixel of the liquid crystal panel 61 is provided with a color filer (not shown) with any appropriate layout so that the substantially-white illumination light IL uniformly entering to the liquid crystal panel 61 is modulated to be a color image.

The projection lens 90 is a projection system configured by any appropriate lens group, and projects the light having passed through the light modulation section 60 onto the projection surface of a screen (not shown, with any appropriate magnification factor.

Described next is the operation of the projector of this embodiment.

The illumination light coming from the light-emitting unit 22 of the light source unit 20 is directed to the critical illumination system 40, and then enters to the liquid crystal panel 61 of the light modulation section 60. The light modulated by the liquid crystal panel 61 is directed to the projection lens 90; and then is projected onto a screen with any appropriate magnification factor. When the light as a result of light emission of the light-emitting section 31 i projected onto the liquid crystal panel 61, the critical illumination system 40 of a simple configuration serves to make the effective area 73 (will be described later by referring to FIGS. 2A to 2C) of the liquid crystal panel 61 completely cover the light so that the effective area 73 of the liquid crystal panel 61 can be illuminated uniformly.

FIGS. 2A to 2C are all a diagram for illustrating the relationship in terms of shape between the light source unit and the light modulation section of FIG. 1. Specifically, FIG. 2A shows the front configuration of a liquid crystal panel configuring the light modulation section, FIG. 2B shows the front configuration of a light-emitting section formed to the light source unit, and FIG. 2C shows the side-surface configuration of the light-emitting section of the light source unit.

In FIG. 2A, the liquid crystal panel 61 is fixed by a metal frame 72 around a body portion 71, and from the upper portion of the metal frame 72, a cable CA is extending for signal supply. Although not shown, the body portion 71 is made of a pair of glass substrates that are disposed in parallel. The glass substrates are each formed with a transparent electrode on the inside surface side, and a liquid crystal layer is sandwiched therebetween. The body portion 71 can change the state of the liquid crystal layer on a pixel basis by the drive power to be applied between the transparent electrodes. The pixel formation area including every pixel is not the body portion 71 in its entirety exposing to an aperture 72a of the metal frame 72 but the center portion not including the peripheral portion. In this embodiment, such an effective area 73 has the outline shape with a length-to-width ratio of substantially 3:4. In this embodiment, the pixel formation area including every pixel is regarded as the effective area 73. Note here that the area for the illumination light IL entering to the liquid crystal panel 61 after passing through the illumination optical system 40 from the light source unit 20 is an illumination area 80. The illumination area 80 is substantially the same in size and shape as the effective area 73 but is slightly extending over the effective area 73.

In this embodiment, the effective area 73 is set with first to third effective image modulation areas 73a, 73b, and 73c. The combined outline shape of the first to third effective image modulation areas 73a to 73c has a length-to-width ratio of substantially 3:4. This outline shape is corresponding to the outline shape of the effective area 73. The outline shape of the first effective image modulation area 73a is so set as to be substantially 9:16.

Note here that these three first to third effective image modulation areas 73a to 73c are not physically individual. More in detail, in the pixel formation area including every pixel configuring the liquid crystal panel 61, the area includes a setting part of operating a liquid crystal layer corresponding to image data portion for a static or moving image, and a setting part of operating the liquid crystal layer corresponding to the image data portion not used as a static or moving image. The image data portions are of image data that has been processed by the image processing section 520 in the projector 1, which will be described later To operate the liquid crystal layer corresponding to any image data portion not used as a static or moving image, the liquid crystal material is activated not to make the illumination light pass therethrough in the area so that the exiting light from the area is favorably off. The image data will be described later in detail.

In this embodiment, as to such three first to third effective image modulation areas 73a to 73c, for modulating an image having a length-to-width ratio of 3:4, all of the first to third effective image modulation areas 73a to 73c are used for modulation suiting the image. For an image having a length-to-width ratio of 9:16, used is only the first effective image modulation area 73a for modulation suiting the image. In this embodiment, if an image different in aspect ratio, e.g., a high-definition image with an aspect ratio of 16:9, is modulated with respect to an image with an aspect ratio of 4:3, for example, such modulation is performed with the outline shape of the effective area 73 that is a fixed pixel formation area. The portions of the effective area 73 with a length-to-width ratio of 3:4 in the up-down (vertical) direction, i.e., the second and third effective image modulation areas 73b and 73c, are subjected to modulation not to make light pass therethrough.

The illumination area 80 is formed with three Illumination areas of first to third illumination areas 80a, 80b, and 80c, corresponding to the first to three effective image modulation areas 73a to 73c. Such a configuration is based on the configuration of the light-emitting section 31, which will be described later.

As shown in FIGS. 2C and 2C, the light-emitting section 31 is a rectangular-shaped light-emitting layer, i.e., the surface emitting layer, and includes three light-emitting layers, i.e., the first to third light-emitting layers 31a, 31b, and 31c. The combined outline shape of the three light-emitting layers 31a to 31c is substantially similar to the combined outline shape of the three effective image modulation areas 73a to 73c, and is with a length-to-width ratio of substantially 3:4. The outline shape of thee first light-emitting layer 31a is substantially similar to the outline shape of the first effective image modulation area 73a, and is with a length-to-width ratio of substantially 9:16. The second light-emitting layer 31b is substantially similar in size and shape to the second effective image modulation area 73b, and the third light-emitting layer 31c is substantially similar in size and shape to the third effective image modulation area 73c.

More in detail, for an, image having a length-to-width ratio of 3:4 for modulation, the first to third light-emitting layers 31a to 31c are used to form the substantially-similar shape with the length-to-width ratio of 3:4, thereby matching the outline shape of the first to third effective image modulation areas 73 to 73c. For an image with a length-to-width ratio of 9:16, only the first light-emitting layer 31a is used to form the substantially-similar shape with the length-to-width ratio of 9:16, thereby matching the outline shape of the first effective image modulation area 73a. Accordingly, for an image having a length-to-width ratio of 3:4 for modulation, the first to third light-emitting layers 31a to 31c are all made to emit light. For an image having a length-to-width ratio of 9:16 for modulation, only the first light-emitting layer 31a is made to emit light, and the second and third light-emitting layers 31b and 31c are not made to emit light, i.e., stop emitting light.

As such, when all of the first to third light-emitting layers 31a to 31c are made to emit light, as shown in FIG. 2A, the area covering the three illumination areas 80a to 80c is illuminated. When only the first light-emitting layer 31a is made to emit light, and the second and third light-emitting layers 31b and 31c are made to stop emitting light, only the area of the first illumination area 80a is illuminated but not the area covering the second and third illumination areas 80b and 80c.

Figure 3:
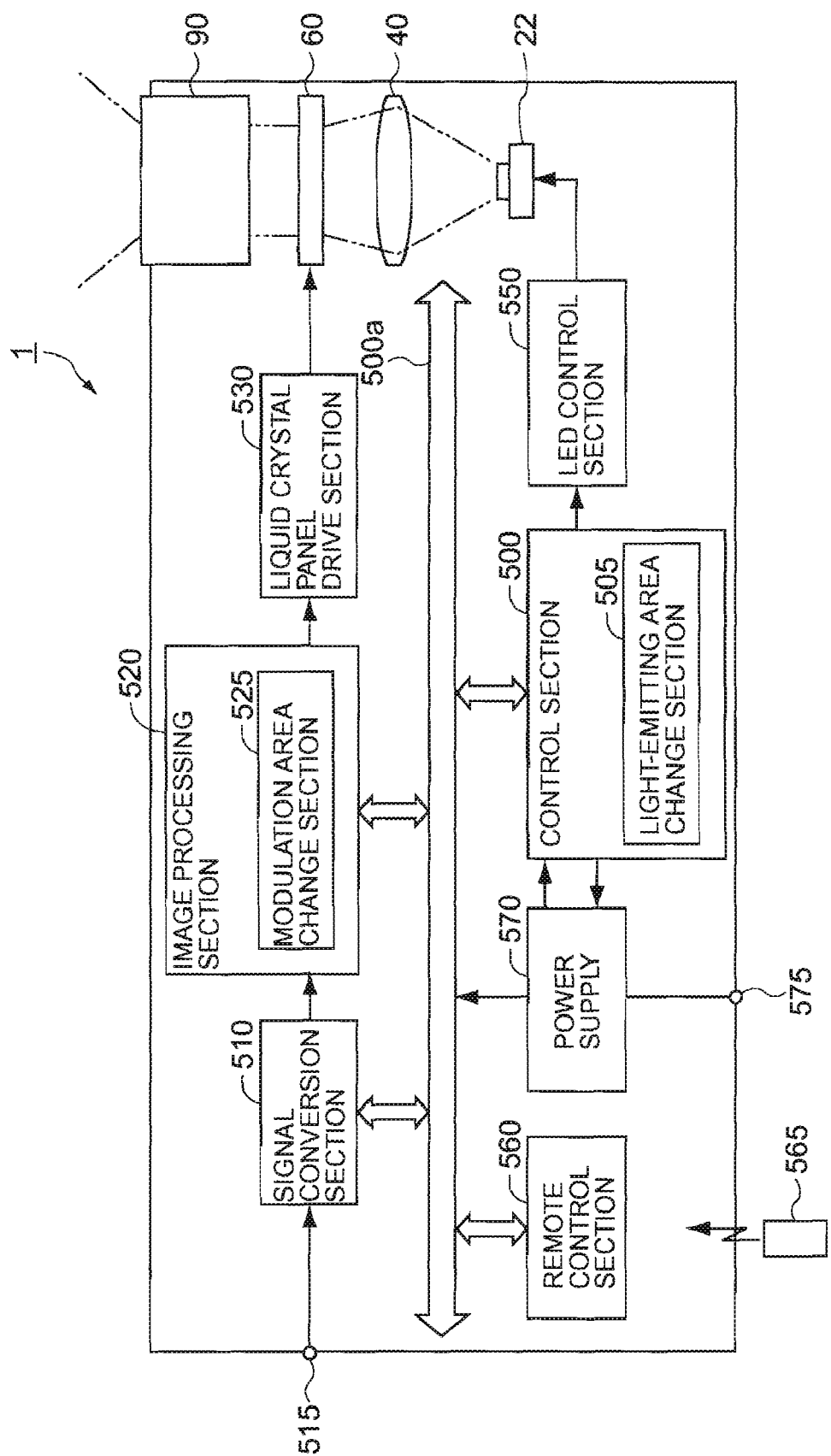
FIG. 3 is a circuit block diagram of a projector.

FIG. 3 is a circuit block diagram of the projector in the first embodiment of the invention. By referring to FIG. 3, a schematic description will be given about the circuit configuration and the operation of the projector 1.

The projector 1 is configured to include a control section 500, a signal conversion section 510, an image processing section 520, a liquid crystal panel drive section 530, an LED control section 550, a remote control section 560, a power supply 570, or others. The image processing section 520 is configured to include a modulation area change section 525. The control section 500 is configured to include a light-emitting area change section 505. The components of the control section 500, the signal conversion section 510, the image processing section 520, and the remote control section 560 are connected to one another over a bus 500a.

The signal conversion section 510 is connected with an image input terminal 515, which receives an analog image signal coming from an external image signal supply unit (not shown), for example. The analog image signal includes an RGB (Red, green, and Blue) signal representing a computer image coming from a personal computer, a composite image signal representing a moving image coming from a VCR (Videocassette Recorder) or a television receiver, or others. Such image signals are provided to the image input terminal 515. The signal conversion section 510 converts the analog image signal received from the image input terminal. 515 into AD (Analog-to-Digital), and the resulting digital image signal is forwarded to the image processing section 520.

The image processing section 520 subjects the digital image signal to processes of frame rate conversion, scaling, and others so that image data is generated. The modulation area change section 525 in the image processing section 520 acquires information about the aspect ratio of the image data from the control section 500. After such information acquisition, the modulation area change section 525 selects, for a change, image data to make the three effective image modulation areas 73a to 73c. in the effective area 73 of the liquid crystal panel 61 operate in accordance with the acquired aspect ratio. Thereafter, the modulation area change section 525 operates to output the resulting image data to the liquid crystal panel drive section 530. In this embodiment, the modulation area change section 525 selects, for output, either the image data for an image with an aspect ratio of 4:3 or the image data for an image with an aspect ratio of 16:9.

The image processing section 520 goes through image processing in consideration of the aspect ratio. More in detail, for the aspect ratio of 4:3, as shown in FIG. 2A, the image data is so provided that the three effective image modulation areas 73a to 73c are all used to be driven for actual display of an image smith an aspect ratio of 4:3. For the aspect ratio of 16:9, the image data is so processed that the second and third effective image modulation sections 73b and 73c are driven not to pass light therethrough, and the first effective image modulation area 73a is driven for actual display of an image with the aspect ratio of 16:9.

Based on the image data provided by the image processing section 520 after aspect ratio change by the modulation area change section 525, the liquid crystal panel drive section 530 drives the effective area 73 of the liquid crystal panel 61 configuring the light modulation section 60.

The control section 500 exercises collective control over the projector 1 in terms of function. The light-emitting area change section 505 in the control section 500 acquires information about the aspect ratio of the image data, and to the LED control section 550, forwards a signal to make the light-emitting area corresponding to the aspect ratio emit light or stop emitting light.

Based on the input signal from the light-emitting area change section 505, the LED control section 550 drives the light-emitting unit 22. More in detail, for an image with an aspect ratio of 4:3, the LED control section 550 drives all of the first to third light-emitting layers 31a to 31c to emit light. For an image with an aspect ratio of 16:9, the LED control section 550 drives only the first light-emitting layer 31a to emit light, and drives the second and third light-emitting layers 31b and 31c to stop emitting light.

As described above, in response to when the modulation area change section 525 changes the effective image modulation area for actual image display by outputting the image data from the image processing section 520 after a data chance to suit the aspect ratio, the light-emitting change section 505 responsively selects any of the three light-emitting layers 31a to 31c configuring the light-emitting area to make it emit light or stop emitting light corresponding to the changed effective image modulation area.

The remote control section 560 outputs a signal for exercising control over the components of the projector 1 in terms of function based on an operation signal coming from a remote controller 565.

The power supply 570 receives power from the outside of the projector 1 by a power supply adapter or others. For such a purpose, the power supply 570 is configured to include a connector 575 for establishing a connection with the power supply adapter or others.

The first embodiment as described above can achieve the effects as below.

1. According to the first embodiment, the light-emitting unit 22 forms the light-emitting area of the three light-emitting layers 31a to 31c, which are shaped to be substantially similar to the outline shape of the three effective image modulation areas 73a to 73cThese effective image modulation areas 73a to 73c are set in the effective area 73 of the liquid crystal panel 61 configuring the light modulation unit. The light-emitting area is made to emit light or stop emitting light as described above in accordance with the aspect ratio. The illumination system 40 configuring the critical illumination system directs the luminous flux as a result of light emission of the light-emitting unit 22. Such light is directed as the illumination light to the above-described effective image modulation areas set in the liquid crystal panel 61 in accordance with the aspect ratio. This enables the use of an illumination system of a simple configuration, and enables light illumination by the light-emitting unit 22 in a direct manner with efficiency corresponding to the outline shape of the three effective image modulation areas 73a to 73c of the liquid crystal panel 61. Accordingly, the illumination light directed to the effective image modulation areas is modulated by the liquid crystal panel 61, and the resulting object light i.e., projected image, can be increased in quality e.g., contrast characteristics. As such, with a simple lens configuration, any effective image modulation area required to be illuminated is accordingly illuminated by making the corresponding light-emitting area emit light. For any effective image modulation area not required to be illuminated, the corresponding light-emitting area is not illuminated so that the resulting projector can offer better quality for projection images.

2. According to the first embodiment, when the modulation area change section 525 selects, for a change, any of the effective image modulation areas 73a to 73c as described above, the light-emitting area change section 505 responsively selects, for a change, any of the light-emitting layers 31a to 31c serving as the light-emitting area to make the changed layer emit light or stop emitting light within the outline shape substantially similar to the changed effective image modulation area. This increases the customer convenience of the projector 1, and the illumination light can be directed or cut off in a direct manner with efficiency with respect to the changed effective image modulation area.

3. According to the first embodiment, the outline shape of the light-emitting section 31 is with a length-to-width ratio of 3:4, and in the light-emitting section 3 the first light-emitting layer 31a is so shaped to have the outline shape with a length-to-width ratio of substantially 9:16. This enables to illuminate any corresponding effective image modulation area in the effective area 73 of the liquid crystal panel 61 in a direct manner with efficiency no matter if an image for modulation has the aspect ratio of 4:3 or 16:9.

4. According to the first embodiment, for an image with an aspect ratio of 16:9, only the first light-emitting layer 31a configuring the light-emitting section 31 of the light-emitting unit 22 is made to emit light, and the second and third light-emitting layers 31b and 31c are made not to emit light (stop emitting light). This thus enables to illuminate only the first effective image modulation area 73a of the liquid crystal panel 61 in a direct manner with efficiency, and not to illuminate the second and third effective image modulation areas 73b and 73c, which are to be displayed in black (display of no light transmission) as having nothing to do wit the image. With the previous configuration that the illumination light coming from the light source is directed to the entire pixel formation area of the liquid crystal panel, the portion having nothing to do with a projection image with an aspect ratio of 16:9 on a screen, i.e., the portion corresponding to the area to be displayed in black, is slightly brightened so that the projection image with an aspect ratio of 16:9 is reduced in contract. On the other hand, in the first embodiment, the contrast can be favorably increased.

5. According to the first embodiment, the light-emitting area of the light-emitting unit 22 is configured by three light-emitting layers 31a to 31c that are shaped to be substantially similar, respectively, to the three effective image modulation areas 73a to 73c set in the effective area 73 of the liquid crystal panel 61. The light-emitting area is made to emit light or stop emitting light with the outline shape corresponding to the aspect ratio. As such, implemented is the light emitting unit 22 that can direct the illumination light in a direct manner with efficiency onto any of the effective image modulation areas 73a to 73c corresponding to the aspect ratio.

Second Embodiment

Described now is a projector of a second embodiment. Compared with the projector 1 of the first embodiment, in the projector of the second embodiment, the liquid crystal panel 61 and the light-emitting unit 22 are both different in shape.

Any other remaining components that are not described are presumed as being the same in configuration as the first embodiment.

The second embodiment describes a case where a liquid crystal panel 261 includes a pixel formation area (an effective area 273) of a fixed size and shape corresponding to an image with an aspect ratio of 16:9, and the liquid crystal panel 261 is so made as to correspond also to an image with an aspect ratio of 4:3 within the outline shape of the effective area 273, i.e., the first embodiment describes the case from the inverse perspective.

FIGS. 4A to 4C are all a diagram for illustrating a case in which a liquid crystal panel and a light-emitting section are changed in shape in the second embodiment of the invention. Specifically, FIG. 4A shows the front configuration of the liquid crystal panel configuraing a light modulation section, FIG. 4B shows the front configuration of the light-emitting section formed to a light source unit, and FIG. 4C shows the side-surface configuration of the light-emitting section of the light source unit.

By referring to FIG. 4A, a body portion 271 not entirely exposing from an aperture 272a of a metal frame 272 but serves as an effective area 273 with a length-to-width ratio of 9:16, located at the center side not including the peripheral portion. Note here that an illumination area 280 is substantially the same as the effective area 273 but is slightly extending over the effective area 273. The illumination area 280 is illuminated when the light-emitting section 231 being a light-emitting area emits light, and the resulting light is directed to the liquid crystal panel 261.

In this embodiment, the effective area 273 is set with first to third effective image modulation images 273a, 273b, and 273c. The combined outline shape of the first to third effective image modulation images 273a to 273c has a length-to-width ratio of substantially 9:16, i.e., corresponds to the outline shape of the effective area 273. The outline shape of the first effective image modulation area 273a is so set as to be substantially 3:4. The idea of the effective image modulation areas is similar to the first embodiment.

In this embodiment, as to such three first to third effective image modulation areas 273a to 273c, for modulating an image having a length-to-width ratio of 9:16, all of the first to third effective image modulation areas 273a to 273c are used for modulation suiting the image. For an image having a length-to-width ratio of 3:4, used is only the first effective image modulation area 273a for modulation suiting the image. In this embodiment, if an image different in aspect ratio e.g., a high-definition image with an aspect ratio of 4:3, is modulated with respect to an image with an aspect ratio of 16:9, for example, such modulation is performed with the outline shape of the effective area 273 that is a fixed pixel formation area. The second and third effective image modulation areas 273b and 273c that cover the right and left (lateral) portions of the effective area 273 with a length-to-width ratio of substantially 9:16 are subjected to modulation not to pass light therethrough.

The illumination area 280 is formed with three illumination areas of first to third illumination areas 280a, 280b, and 280c, corresponding to the first to three effective image modulation areas 273a to 273c. Such a configuration is based on the configuration of the light-emitting section 231, which will be described later.

As shown in FIGS. 4B and 4C, the light-emitting section 231 is a rectangular-shaped light-emitting layer, i.e., the surface emitting layer, and includes three light-emitting layers, i.e., the first to third light-emitting layers 231a, 231b, and 231c. The combined outline shape of the three light-emitting layers 231a to 231c is substantially similar to the combined outline shape of the three effective image modulation areas 273a to 273c and is with a length-to-width ratio of substantially 9:16. The outline shape of the first light-emitting layer 231a is substantially similar to the outline shape of the first effective image modulation area 273a, and is with a length-to-width ratio of substantially 3:4. The second light-emitting layer 231b is substantially similar in size and shape to the second effective image modulation area 273b, and the third light-emitting layer 231c is substantially similar in size and shape to the third effective image modulation area 273c.

More in detail, for an image with a length-to-width ratio of 9:16 for modulation, all of the first to third light-emitting layers 231a to 231c are used to form the substantially shape having the length-to-width ratio of 9:16, thereby matching the outline shape of the first to third effective image modulation areas 273a to 273c. For an image with a length-to-width ratio of 3:4, used is only the first light-emitting layer 231a to form the substantially-similar shape having the length-to-width ratio of 3:4, thereby matching the outline shape of the first effective image modulation area 273a. Accordingly, for an image with a length-to-width ratio of 9:16 for modulation, the first to third light-emitting layers 231a to 231c are all made to emit light. For an image with a length-to-width ratio of 3:4 for modulation, only the first light-emitting layer 231a is made to emit light, and the second and third light-emitting layers 231b and 231c are not made to emit light, i.e., stop emitting light.

As such, when all of the first to third light-emitting layers 231a to 231c are made to emit light, as shown in FIG. 4A, the area covering the three illumination areas 280a to 280c is illuminated. When only the first light-emitting layer 231a is made to emit light, and the second and third light-emitting layers 231b and 231c are made not to emit light, only the area of the first illumination area 280a is illumination but not the area covering the second and third illumination areas 280b and 280c.

Compared with the first embodiment, the second embodiment is different therefrom only in the shape of the effective image modulation areas in the effective area, the shape of the light-emitting areas of the light-emitting section, and the shape of the illumination areas. The second embodiment achieves the similar effects as the first embodiment.

According to the second embodiment, the outline shape of the light-emitting section 231 has a length-to-width ratio of substantially 9:16 and in the light-emitting section 231, the outline shape of the first light-emitting layer 231a has the length-to-width ratio of substantially 3:4. This enables to illuminate any corresponding effective image modulation area in the effective area 273 of the liquid crystal panel 261 in a direct manner with efficiency no matter if an image for modulation has the aspect ratio of 16:9 or 4:3.

According to the first and second embodiments, no matter if an image has an aspect ratio of 4:3 or 16:9, the configuration of the light-emitting layers of the light-emitting sections 31 and 231 enables to direct the illumination light to any necessary effective image modulation area in a direct manner with efficiency so that the resulting projector 1 can offer better quality or projection images.

While the invention has been described in detail, the foregoing description is in all aspects illustrative and not restrictive. It is understood that numerous other modifications and variations can be devised. Modified examples are described below.

MODIFIED EXAMPLE 1

Figure 5:
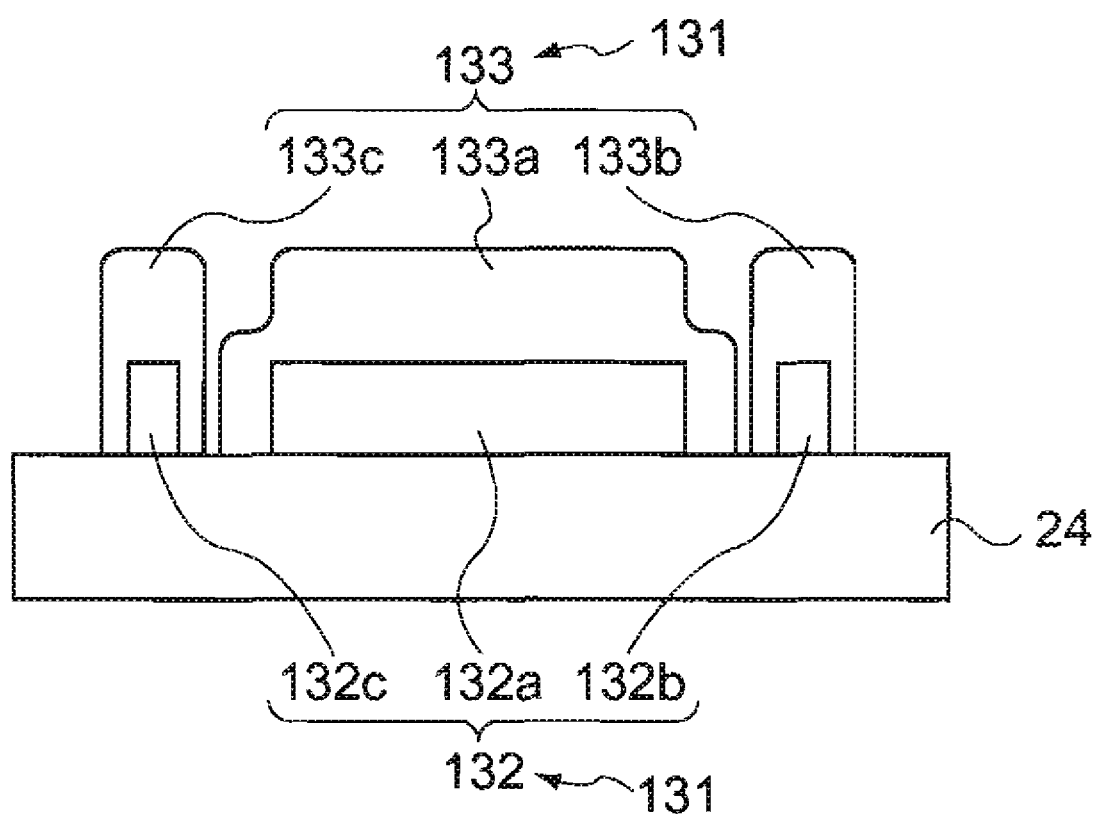
FIG. 5 is a schematic cross sectional view of the light-emitting section of FIG. 2B changed in shape.

FIG. 5 is a schematic cross sectional view of a light-emitting section 131, which is different in shape from the light-emitting section 31 of FIG. 2B in first embodiment. This light-emitting section 131 is provided with rectangular-shaped surface emitting devices 132 (132a, 132b, and 132c) all made of a semiconductor material, and fluorescent layers 133 (133a, 133b, and 133c) covering each corresponding surface emitting device 132. The fluorescent layers 133 convert light of blue coming from the surface emitting devices 132 each being the light-emitting layer into light of green or red, for example. With this being the case, because the fluorescent layers 133 emit illumination light, the outline shape of the light-emitting area corresponding to a light-exiting area of the respective fluorescent layers 133a to 133c is of the same size as the light-emitting layers 31a to 31c of FIG. 2B, and is substantially similar to the outline shape of the effective image modulation areas 73a to 73c set in the effective area 73 of the liquid crystal panel 61 of FIG. 2A. The light-emitting section 131 configured as such may be provided to the light-emitting section unit. Note here that the light-emitting unit including such a light-emitting section 131 is applicable similarly to the second embodiment.

MODIFIED EXAMPLE 2

In the first embodiment, the projector configured to include the liquid crystal panel 61 with a color filter, and the light-emitting unit 22 emitting light of substantially white. This is not the only possible configuration, and the projector 1 may include three liquid crystal panels and three light-emitting units. If this is the case, the light-emitting units are all similarly configured as in the first embodiment, and may emit color lights varying in color (red, green, and blue). The resulting color lights are directed to each corresponding effective image modulation area formed to the liquid crystal panels by the illumination system 40. The color lights are then modulated and exited by the liquid crystal panels 61, and the resulting lights are combined together by a cross dichroic mirror. The combined light is then projected on a screen after passing through a projection lens. Such a configuration is also able to achieve the effects of the first embodiment and the resulting projector can be increased in configuration flexibility. This is also applicable similarly to the second embodiment.

MODIFIED EXAMPLE 3

In the above embodiments, using a sphere lens whose surfaces are both convex, i.e., so-called light gathering lens, the illumination system 40 gathers source light coming from thee light-emitting section 31 of the light source unit 20 with a constant divergence angle, and directs the light to the light modulation section 60 substantially uniformly. This is surely not restrictive, and using the light gathering lens and a rod integrator lens, the light from the light gathering lens may be directed to the rod integrator lens, and the light exiting therefrom may be directed to the light modulation section 60. With this being the configuration, the effects of the embodiments can be similarly achieved without reducing the efficiency of the source light. The disposition relationship can be freely set between the light source unit 20 and the light modulation unit 60 so that the resulting projector can be reduced in size. If a rod integrator lens is Included to the configuration of the modified example 2, the projector can be increased in configuration flexibility to a further degree, and can be increased also in brightness.

MODIFIED EXAMPLE 4

In the first embodiment, the light-emitting section 31 is configured by three light-emitting layers 31a to 31c. This is not the only configuration, and these light-emitting layers may be each divided into plural. If this is the case, when made to emit light or stop emitting light, the resulting light-emitting layers are required to operate to form the outline shape of the three light-emitting layers 31a to 31c. This is applicable also to the second embodiment.

MODIFIED EXAMPLE 5

In the first embodiment, the light-emitting section 31 is configured by three light-emitting layers 31a to 31c, and the combined outline shape is configured to have a length-to-width ratio of substantaially 3:4 to be substantially similar in shape to the effective area 73 of the liquid crystal panel 61. The first light-emitting layer 31a is configured to have a length-to-width ratio of substantially 9:16. This is surely not restrictive, and on the precondition that the outline shape of the light-emitting section 31 is substantially similar in shape to the effective area 73 of the liquid crystal, panel 61, i.e., the length-to-width ratio of substantially 3:4, a plurality of light-emitting layers of the same shape may be formed, e.g., in an array or matrix, and such light-emitting layers may be driven individually or by a group of predetermined number of layers. Based on the outline shape of the effective image modulation areas that are freely set to the liquid crystal panel, this enables to make the light-emitting layers emit light or stop emitting light to be substantially similar in shape thereto. As a result, the effective image modulation areas can be illuminated the efficiency, and the customer convenience as the light emitting unit can be increased. This is especially effective when trapezoid correction is applied to images. This is applicable also to the second embodiment by changing the configuration as such.

MODIFIED EXAMPLE 6

In the embodiment, the light-emitting unit 22 is provided with the package 26 whose light-exiting plane is flat. This is surely not restrictive, and the light-exiting surface of the package 26 may be shaped convex or concave for critical illumination with respect to the liquid crystal panel 61 or others by operating together with the illumination system 40.

MODIFIED EXAMPLE 7

In the embodiments, the liquid crystal panels 61 and 261 are both of a transmissive type. This is surely not restrictive, and the liquid crystal panels may be of a reflective type. Even with this being the case, the light source unit 20, the illumination system 40, or others can be utilized.

MODIFIED EXAMPLE 8

In the embodiments, the liquid crystal panels 61 and 261 are used. This is surely not restrictive, and alternatives to the liquid crystal panels 61 and 261, a digital micromirror device is a possibility. Even with this being the case, the digital micromirror device can be illuminated by utilizing the light source unit 20, the illumination system 40, or others.

MODIFIED EXAMPLE 9

In the embodiments, the projector 1 is of a front projector that performs image projection from the direction observing the projection surface. This is surely not restrictive, no the projector may be a rear projector that performs image projection from the direction opposite to that of observing the projection surface. Even with this being the case, the configuration of the projector of the embodiments can be applicable.

MODIFIED EXAMPLE 10

In the embodiments, the light of an image formed in the light modulation section 60 is projected onto a screen with an appropriate magnification factor by the projection lens 90. This is surely not restrictive, and a display unit may be of a type directly observing the light modulation section 60. If this is the case, the viewability can be increased by appropriately increasing the size of the effective areas of the liquid crystal panel, the light source unit, the illumination optical system, and others.

What is claimed is:

1. A display unit, comprising:
   a light modulation unit that includes an effective area and an illumination area, and modulates an illumination light entering the effective area without modulating an illumination light entering the illumination area, a plurality of effective image modulation areas being set in the effective area, with each effective image modulation area being surrounded by a portion of the illumination area;
   a light-emitting unit that includes a plurality of light-emitting areas that can be made to emit a light or stop emitting a light, the plurality of light emitting areas being substantially similar in outline shape to the plurality of effective image modulation areas set in the effective area;
   a critical illumination system that guides, as the illumination light, a luminous flux as a result of light emission of the light-emitting unit onto the effective image modulation areas in the effective area of the light modulation unit and their respective illumination areas, wherein:
   the plurality of effective image modulation areas include a first effective image modulation area, a second effective image modulation area, and a third effective image modulation area,
   the illumination area includes a plurality of illumination areas,
   the portion of the illumination area surrounding the first effective image modulation area includes a partial portion of the second effective image modulation area and a partial portion of the third effective image modulation area when modulating only light entering the first effective image modulation area,
   the first effective image modulation area has a length-to-width ratio of 9:16, and the second effective image modulation area and the third effective image modulation area having dimensions, such that their combination with the first effective image modulation area results in a combined effective area having a length-to-width ratio of 3:4,
   the plurality of light emitting areas includes a first light-emitting layer, a second light-emitting layer, and a third light-emitting layer, each shaped so as to be substantially similar to the outline shape of the first effective image modulation area, second effective image modulation area and third effective image modulation areas, respectively.

2. The display unit according to claim 1, further comprising:
   a modulation area change section that selects, for a change, any of the effective image modulation areas; and
   a light-emitting area change section that selects, for a change, any of the light-emitting areas,
   when the modulation area change section selects any of the effective image modulation areas for a change, the light-emitting area change section responsively selects any of the light-emitting areas, for a change, corresponding to the changed effective image modulation area to enable light emission or stop light emission with a substantially similar outline shape.

3. The display unit according to claim 1,
   the light-emitting unit including:
   a light-emitting layer that emits a color light; and
   a fluorescent layer that emits a fluorescent light in response to the light from the light-emitting layer,
   the light-emitting areas each corresponding to a light-exiting area of the fluorescent layer.

4. The display unit according to claim 1,
   the light-emitting unit including a solid-state light-emitting device, and
   the light-emitting areas being a surface emitting layer of the solid-state light-emitting device.

5. The display unit according to claim 1,
   the light-emitting unit including a solid-state light-emitting device, and
   the light-emitting areas being a fluorescent layer formed on a surface emitting layer of the solid-state light-emitting device.

6. The display unit according to claim 1,
   the critical illumination system magnifying the light as a result of light emission of the light-emitting areas in the light-emitting unit with a predetermined magnification factor, and projecting a magnified result onto the effective image modulations areas of the effective area in the light modulation unit.

7. The display unit according to claim 1, further comprising a projection lens that magnifies the light coming from the light modulation unit for projection.

8. A light-emitting unit for use in a display unit, the display unit including a light modulation unit that includes an effective and an illumination area, and modulates an illumination light entering the effective without modulating an illumination light entering the illumination area, a plurality of effective image modulation areas being set in the effective area with each effective image modulation area being surrounded by a portion of the illumination area, the display unit also including a critical illumination system, the light-emitting unit comprising:
   a plurality of light-emitting areas that can be made to emit a light or stop emitting a light, the plurality of light emitting areas being substantially similar in outline shape to the plurality of effective image modulation areas set in the effective area;
   the critical illumination system guiding, as the illumination light, a luminous flux as a result of light emission of the light-emitting unit onto the effective image modulation areas in the effective area of the light modulation unit and their respective illumination areas, wherein:

the plurality of effective image modulation areas include a first effective image modulation area, a second effective image modulation area, and a third effective image modulation area, the illumination area includes a plurality of illumination areas, the portion of the illumination area surrounding the first effective image modulation area includes a partial portion of the second effective image modulation area and a partial portion of the third effective image modulation area when modulating only light entering the first effective image modulation area, the first effective image modulation area has a length-to-width ratio of 9:16, and the second effective image modulation area and the third effective image modulation area having dimensions, such that their combination with the first effective image modulation area results in a combined effective area having a length-to-width ratio of 3:4, the plurality of light emitting areas includes a first light-emitting layer, a second light-emitting layer, and a third light-emitting layer, each shaped so as to be substantially similar to the outline shape of the first effective image modulation area, second effective image modulation area and third effective image modulation areas, respectively.

9. The display unit according to claim 1, wherein:

the illumination area includes a first illumination area, a second illumination area and a third illumination area, and the first illumination area, the second illumination area and the third illumination area surround the first effective image modulation area, the second effective image modulation area and the third effective image modulation area, respectively, when modulating light entering the first effective image modulation area, the second effective image modulation area and the third effective image modulation area.

10. The light-emitting unit according to claim 8, wherein:

the illumination area includes a first illumination area, a second illumination area and a third illumination area, and the first illumination area, the second illumination area and the third illumination area surround the first effective image modulation area, the second effective image modulation area and the third effective image modulation area, respectively, when modulating light entering the first effective image modulation area, the second effective image modulation area and the third effective image modulation area.

\* \* \* \* \*